B. A. ROGERS.
Tightening Carriage-Wheels.

No. 19,951.

Patented Apr. 13, 1858.

UNITED STATES PATENT OFFICE.

B. A. ROGERS, OF SHUBUTA, MISSISSIPPI.

TIGHTENING THE SPOKES AND FELLIES OF CARRIAGE-WHEELS.

Specification of Letters Patent No. 19,951, dated April 13, 1858.

*To all whom it may concern:*

Be it known that I, B. A. ROGERS, of Shubuta, in the county of Clark and State of Mississippi, have invented a new and useful Improvement in Tightening Up Carriage-Wheels in Case of Shrinkage; and I do hereby declare that the following is a full, clear, and exact description of the same, reference being had to the accompanying drawings, forming part of this specification, in which—

Figure 2:
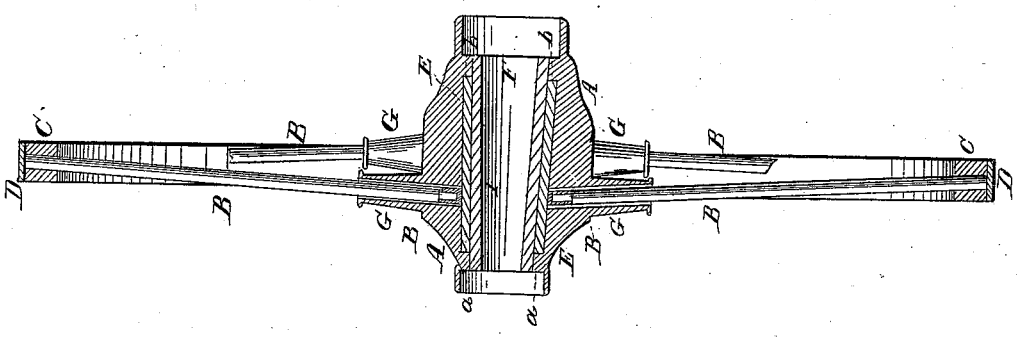
Figure 1:
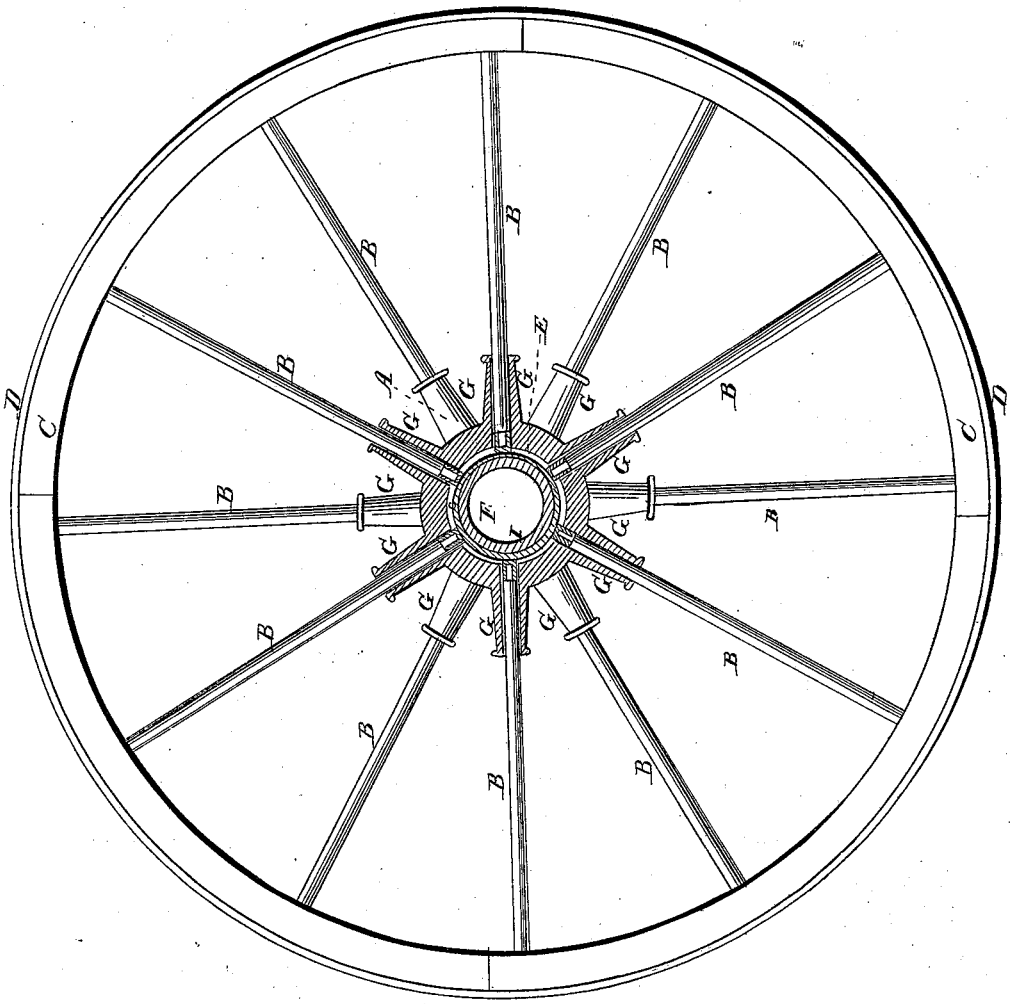

Figure 1, is a side view of the wheel, the hub being sectioned transversely. Fig. 2, is a vertical longitudinal section of the wheel.

Similar letters of reference in each of the several figures indicate corresponding parts.

The nature of my invention consists in the combination, in a wheel, of the annular chamber, spoke sockets, communicating with said chamber; expanding packing ring, taper axle box, and extended spokes as presently described.

With this arrangement, after the spokes are inserted and the wheel put together, the wheel can be tightened up by inserting a taper axle box into the nave of the hub so as to expand the packing ring and cause it to bear against the ends of the spokes. And again, in case of shrinkage, after the wheel has been in use, by simply withdrawing the box and inserting a duplicate packing ring or removing the one first applied and substituting therefor one of greater thickness and driving it home with the taper axle box, all the spokes can be moved outward radially and the rim expanded so as to fit the tire snugly and effect a perfect tightening up of the wheel.

To enable others skilled in the art to make and use my invention, I will proceed to describe its construction and operation.

A, is the hub, adapted for receiving two sets of spokes B, B, as shown.

C, is the rim and D, the tire of the wheel.

E, is an annular chamber formed in the hub A, by enlarging the circumference of its eye F, from $a$, to $b$.

G, G, are a series of small sockets projecting radially from the circumference of the hub A; these sockets extend entirely through the solid part of the hub and terminate in the annular chamber E.

H, is the ring of packing which is fitted to the chamber E; this packing ring is broken at $c$, so that it may be expanded so as to be made to bear against the end of the spokes as illustrated.

I, is the taper axle box which is inserted into the nave or eye of the hub and serves for driving the packing ring home and confining it in place as shown.

In Fig. 1, the wheel is shown as it appears when just completed and before being used. A thin packing ring being used and a space existing between the packing ring and the circumference of the annular chamber E.

In Fig. 2, the wheel is shown as it appears after having been some time in use and tightened up several times after my invention. A thick packing ring being used and no space existing between said ring and the circumference of the annular chamber. This arrangement will afford great facilities for tightening up wheels and thus avoid vexatious delays in these sections of the country where the shops of blacksmiths and mechanics are not to be conveniently found, and indeed under all circumstances will be very useful and valuable, inasmuch as time, labor and money will be saved by its adoption.

I do not claim having the spokes communicate with the eye of the hub and expanded by a core box, but What I do claim as my invention and desire to secure by Letters Patent, is—

The combination, in a wheel, of the annular chamber E, spoke sockets G, communicating with said chamber; expanding packing ring H, taper axle box I, and extended spokes B, B, substantially as and for the purposes set forth.

B. A. ROGERS.

Witnesses:
G. YORKE AT LEE,
J. E. McCORMICK.